Oct. 24, 1933. T. R. MILLER 1,931,670
FERTILIZER DISTRIBUTOR
Filed March 8, 1930 2 Sheets-Sheet 1
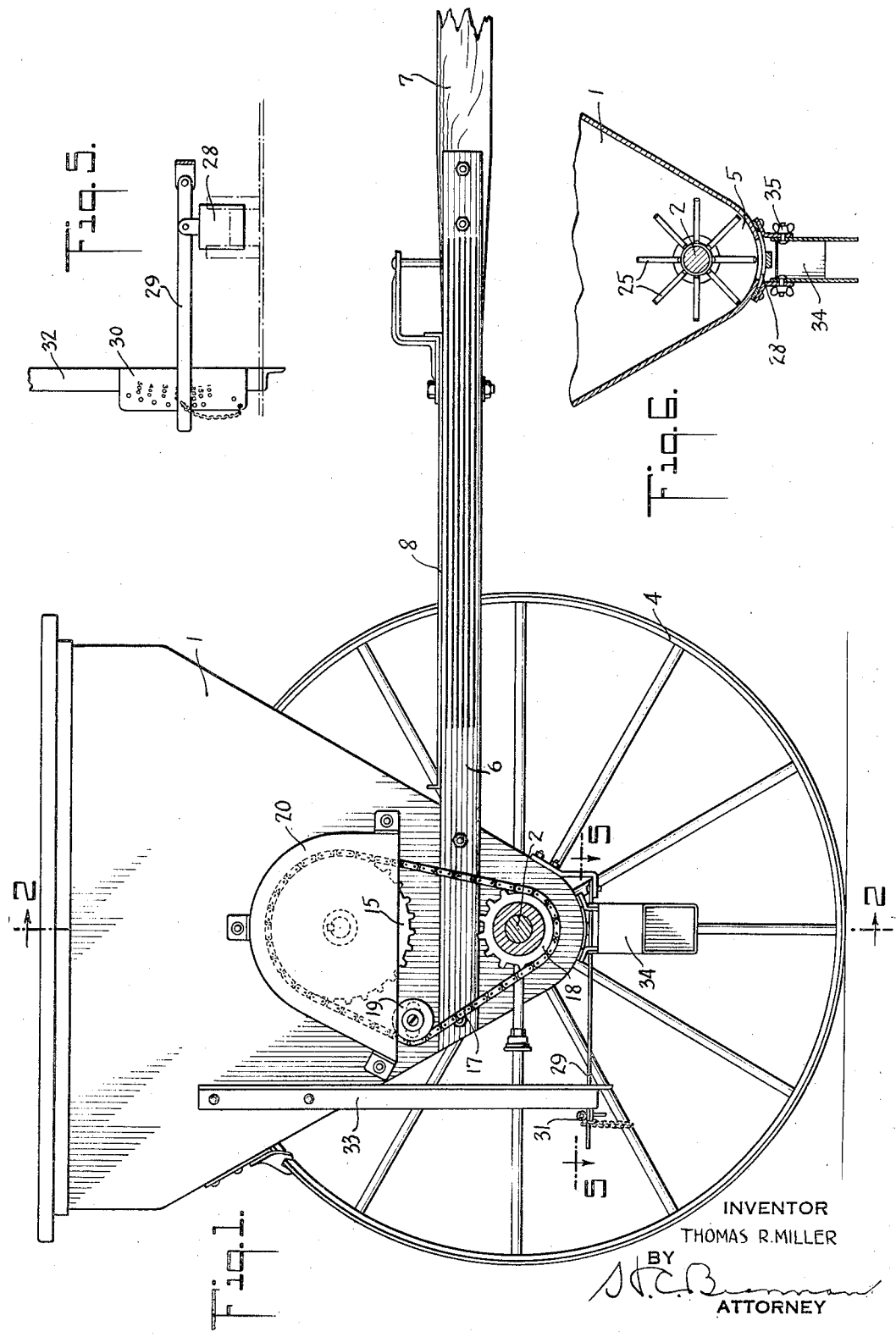
INVENTOR
THOMAS R. MILLER
BY
ATTORNEY Oct. 24, 1933. T. R. MILLER 1,931,670
FERTILIZER DISTRIBUTOR
Filed March 8, 1930 2 Sheets-Sheet 2
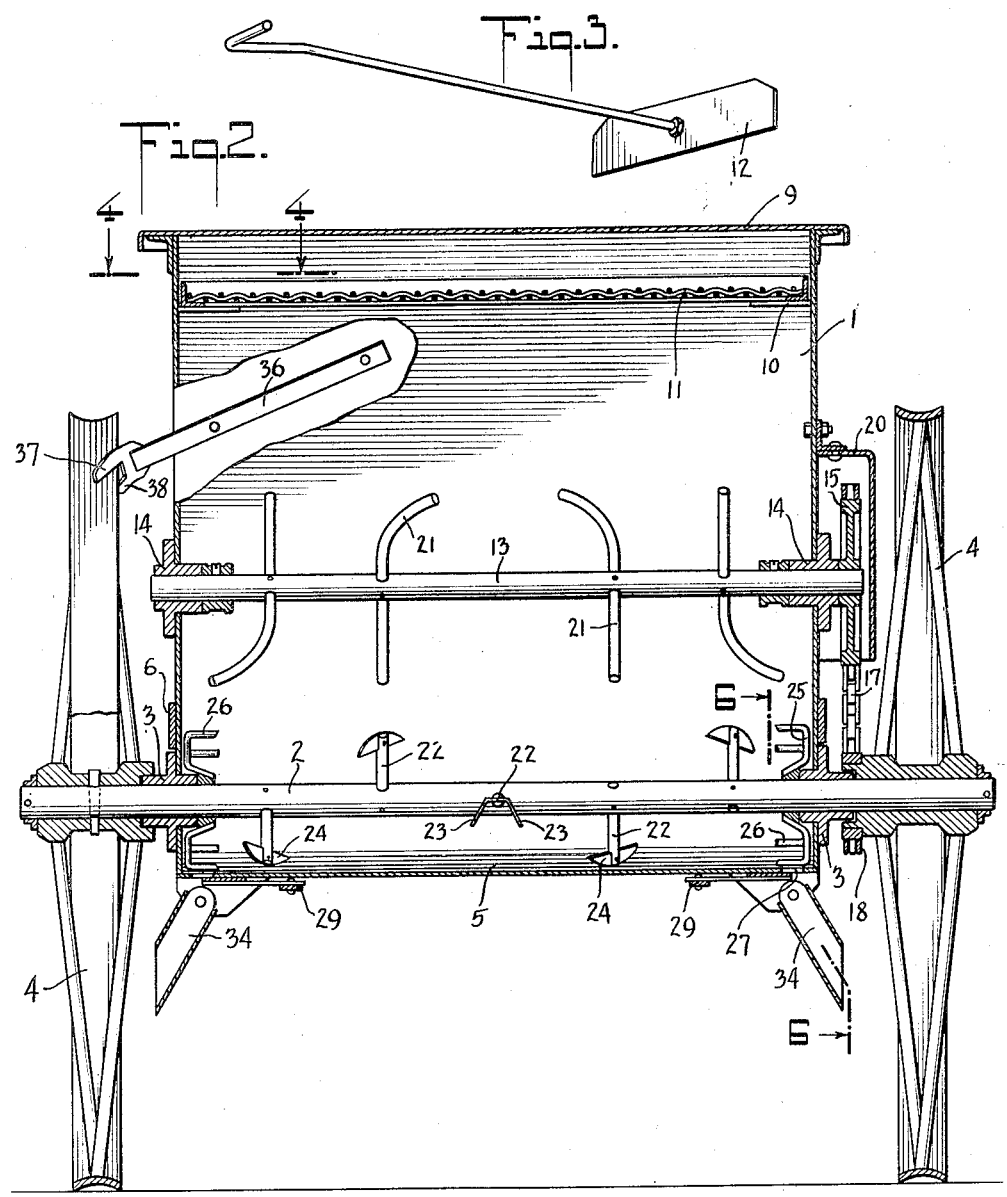
INVENTOR
THOMAS R. MILLER
BY
ATTORNEY Patented Oct. 24, 1933

1,931,670

UNITED STATES PATENT OFFICE 1,931,670

FERTILIZER DISTRIBUTOR

Thomas R. Miller, Bossier City, La., assignor to American Cyanamid Company, New York, N. Y., a corporation of Maine Application March 8, 1930. Serial No. 434,314

1 Claim. (Cl. 221—120)

My present invention relates to a device for distributing fertilizer.

In the distribution of fertilizers of which calcium cyanamid is a type, it is necessary in order to get a proper distribution and to prevent clogging of the apparatus, that a device be used which will maintain the material in powdered form and which will so handle the material that clogging will be prevented.

The principal object of the invention therefore is to provide a distributor which will efficiently handle fertilizers of the calcium cyanamid type, by maintaining the same in powdered form so that definitely regulatable amounts may be fed therefrom to a nicety not accomplished by any other distributors of which I am now aware, which will maintain the material in the distributor in a constant state of agitation, which will be of such a simple construction that clogging of the feeding apparatus will be prevented, and which may cause the material leaving the same to be directed against the wheels of the distributor so as to further insure proper distribution.

In practicing the invention, I provide a hopper mounted on an axle which passes through the same, the axle carrying ground engaging wheels. A feed opening is provided at each end of the hopper bottom, closed by adjustable feed gates having an operating handle attached thereto moving over a dial which may indicate the pounds of fertilizer passing through the opening per acre. The hopper is provided with a series of agitators to maintain the material in powdered form, and these agitators may conveniently comprise arms attached to the axle having blades at their ends, adapted to advance and direct material within the hopper toward the feed openings. A feed spider may also be mounted directly on the axle and sweep that portion of the hopper adjacent the feed openings so as to force the material through the feed openings. Above the driving axle I prefer to mount a second or upper agitator shaft carrying blades to assist in the agitation. The upper portion of the hopper is preferably supplied with a screen having a mesh of a predetermined size, dependent upon the fertilizer which it is intended to distribute so that only particles of a desired size may be delivered to the hopper. Where the material contains lumps or particles of a larger size than will pass through the screen, they may be broken up by a hoe or the like and forced through the screen. It is desirable to provide pivoted chutes beneath each of the feed openings which permit material delivered thereto to reach the ground over a wide latitude of area, and it has been found desirable, particularly with calcium cyanamid, to arrange these chutes in such a direction that the material will be directed against the wheels as they rotate, which further insures the proper distribution of material.

The invention further consists in the novel arrangement, combination and construction of parts more fully shown in the drawings and particularly described hereinafter.

Fig. 1 is a side elevation of a distributor embodying my invention.

Fig. 2 is a view along the line 2—2 of Fig. 1.

Fig. 3 is a perspective view of a hoe.

Fig. 4 is a view along the line 4—4 of Fig. 2.

Fig. 5 is a view along the line 5—5 of Fig. 1.

Fig. 6 is a view along the line 6—6 of Fig. 2.

Referring now with particularity to the embodiment illustrated, I have shown a hopper 1 of any desired material mounted upon a drive axle 2 which penetrates the same and is carried in bearings 3 in the side walls thereof. Ground engaging wheels 4 are mounted at each end of the axle and serve to actuate all of the moving parts. The hopper has substantially parallel side walls and converges toward the bottom thereof, the bottom 5 being a portion of a cylindrical surface for purposes to be more fully described hereinafter.

A frame 6 is secured at each side wall of the hopper and is also secured to a pole or shaft 7 carrying suitable mechanism for attachment to a tractor, or if desired the device may be drawn by horses. A plate 8 is mounted on top of the arm and serves not only as a brace therefor but also as a platform upon which the operator may stand.

The hopper is normally covered in operation with a closure 9 to prevent the material being blown about.

In the upper portion of the hopper and upon a shelf 10 is located a screen 11 of any desired mesh, which closes the mouth of the hopper and upon which the material to be distributed is dumped. The mesh of the screen is such as to exclude lumps, and when lumps are retained on the screen they may be further broken up and delivered to the hopper by scraping a hoe 12 back and forth across the screen, thereby insuring that all of the material in the hopper is initially delivered thereto in powdered form.

An upper shaft 13 is mounted in bearings 14 carried by the side walls of the hopper, and at one end of the shaft 13 is secured a sprocket 15 connected by chain 17 to a sprocket 18 on the hub of one of the drive wheels, so that upon rotation of the ground engaging wheel 4, rotation of the agitator shaft 13 is secured. An adjustable idler 19 between the sprockets 15 and 18 provides for the proper tightening of the chain 17. A guard 20 is mounted on the side of the hopper and protects the various sprockets in the chain from material dropping thereon.

The upper agitator shaft is provided with a series of blades 21 mounted at various angles and having a portion thereof curved in order to prevent arching of the material in the hopper.

Suitably mounted upon the driving axle 2 is a series of agitator arms 22, the center one of which is provided with a blade having deflecting portions 23. This agitator blade is adapted to sweep the curved portion 5 of the hopper bottom, and due to the angularity thereof, direct the material from the center of the hopper bottom toward each end thereof. The remaining agitator arms 22 have blades 24 thereon also arranged at an angle to the axle axis and to sweep the hopper bottom and direct the material toward one end of the hopper Also mounted on the axle 2 at the extreme ends of the hopper bottom are feed spiders 25, the arms of which have horizontal fingers 26 adapted to sweep that portion of the hopper bottom directly adjacent the feed opening 27 provided at each end of the hopper. Each feed opening is closed by an adjustable feed gate 28 movable by operating lever 29 which travels over a gauge or dial plate 30 on which may be placed figures indicating the amount of material passing through the opening in any desired position of the gate 28. As shown in Fig. 5, I prefer to use figures indicating pounds of fertilizer fed per acre. Lever 29 may be secured in any desired position by means of the pin 31 passing through the lever 29 and the desired hole in the dial plate 30. The dial plate may be conveniently secured to a member 32 suspended from element 33 which is secured to the side of the hopper.

Directly beneath each of the feed openings 27 is a pivoted chute 34, the angularity of which may be fixed by the wing nuts 35.

A scraper may be mounted on the side of the hopper to remove mud from the bottom of the wheel and fertilizer from the top thereof. This scraper may conveniently consist of an arm 36 secured to the side of the hopper and terminating in a finger 37 scraping the outside of the wheel and in a finger 38 scraping the inside thereof.

In operation, the cover 9 of the hopper is removed and the material to be distributed dumped upon screen 11. The material may be forced through the screen by means of the hoe 12 until the hopper 1 is filled to a desired extent with powdered material. The cover is then replaced on the hopper which prevents the material from blowing about.

A predetermined feed opening may be secured by movement of the operating handle 29 into the desired position. Upon movement of the distributor over the ground, the axle 2 under impulse of the whel 4 rotates and due to the chain 17 this rotation causes rotation of the upper agitator shaft 13. By suitably choosing the relative size of the sprockets 15 and 18, the upper agitator shaft may be made to rotate at any desired speed. Rotation of the upper agitator shaft, by reason of the arms or blades 31 keeps the material of the upper portion of the hopper in a constant state of agitation and arching is prevented. The arms 22 on the axle not only continue the agitation of the material in the hopper but through their blades 23 and 24 direct the material in the hopper bottom toward the feed opening at each end thereof. The feed openings are maintained clear and the fertilizer forced therethru by reason of the rotation of the feed spiders 26 as the horizontal fingers sweep the portion of the hopper bottom adjacent to feed openings. From the openings the material drops into the chutes 34 and from thence to the ground. As above set forth, in some instances it will be desirable to adjust the angularity of the chute 34 so that the material delivered will fall against the spokes and rim of the operating wheels 4 as this will further insure proper and even distribution.

While the invention has been described with particular reference to the apparatus shown, yet it is to be distinctly understood that it is not to be limited thereto as many changes will occur to one skilled in the art without departing from the spirit of the invention. While the embodiment shown is particularly adapted for the distribution of fertilizers of which calcium cyanamid is a type, yet obviously any material may be distributed therethru which requires agitation and positive feeding, and therefore the invention is to be construed broadly and limited only by the scope of the claim.

I claim:

A fertilizer distributor comprising a hopper, an axle carrying the hopper and extending through the same, a feed opening at each end of the hopper, said axle carrying an agitator arm having means thereon for directing material in the hopper towards each end thereof, other agitator arms on the axle for directing material toward one end of the hopper, a feed spider on the axle at each end of the hopper having horizontal fingers sweeping the hopper adjacent the feed opening and means for rotating the axle.

THOMAS R. MILLER.